Oct. 8, 1940. J. M. HALL 2,217,547

CONCENTRATING AND DEHYDRATING APPARATUS AND METHOD

Filed Nov. 14, 1938 3 Sheets-Sheet 1

Inventor
Joseph M. Hall
By Mann, Brown & Co
Attys.

Oct. 8, 1940. J. M. HALL 2,217,547

CONCENTRATING AND DEHYDRATING APPARATUS AND METHOD

Filed Nov. 14, 1938 3 Sheets-Sheet 2

Inventor:
Joseph M. Hall
By Mann Brown & Co
Attys.

Oct. 8, 1940. J. M. HALL 2,217,547

CONCENTRATING AND DEHYDRATING APPARATUS AND METHOD

Filed Nov. 14, 1938 3 Sheets-Sheet 3

Inventor:
Joseph M. Hall
By Mann, Brown & Co. Attys.

Patented Oct. 8, 1940

2,217,547

UNITED STATES PATENT OFFICE 2,217,547

CONCENTRATING AND DEHYDRATING APPARATUS AND METHOD

Joseph M. Hall, Chicago, Ill.

Application November 14, 1938, Serial No. 240,323

11 Claims. (Cl. 159—4)

This invention relates to systems for dehydrating liquid products and the like.

One of the objects of the invention is the provision of a new and improved apparatus and method for dehydrating liquid products by utilizing a drying gaseous medium together with novel means for assisting in separating the drying medium from the dehydrated particles of the product.

Another object of the invention is the provision of a dehydrator chamber having new and improved means for dehydrating a liquid product and for efficiently separating the dehydrated particles from the drying medium in a single chamber in a continuous operation.

Other and further objects of the invention are the provision of a new and improved apparatus for concentrating and dehydrating liquid products that is comparatively simple in construction, effective in operation, and that is adapted to dehydrate liquid products without affecting the chemical composition of the product or changing its physical characteristics except to remove the moisture.

Other and further objects and advantages of the invention will appear from the following description taken in connection with the accompanying drawings, in which—

Figure 1:
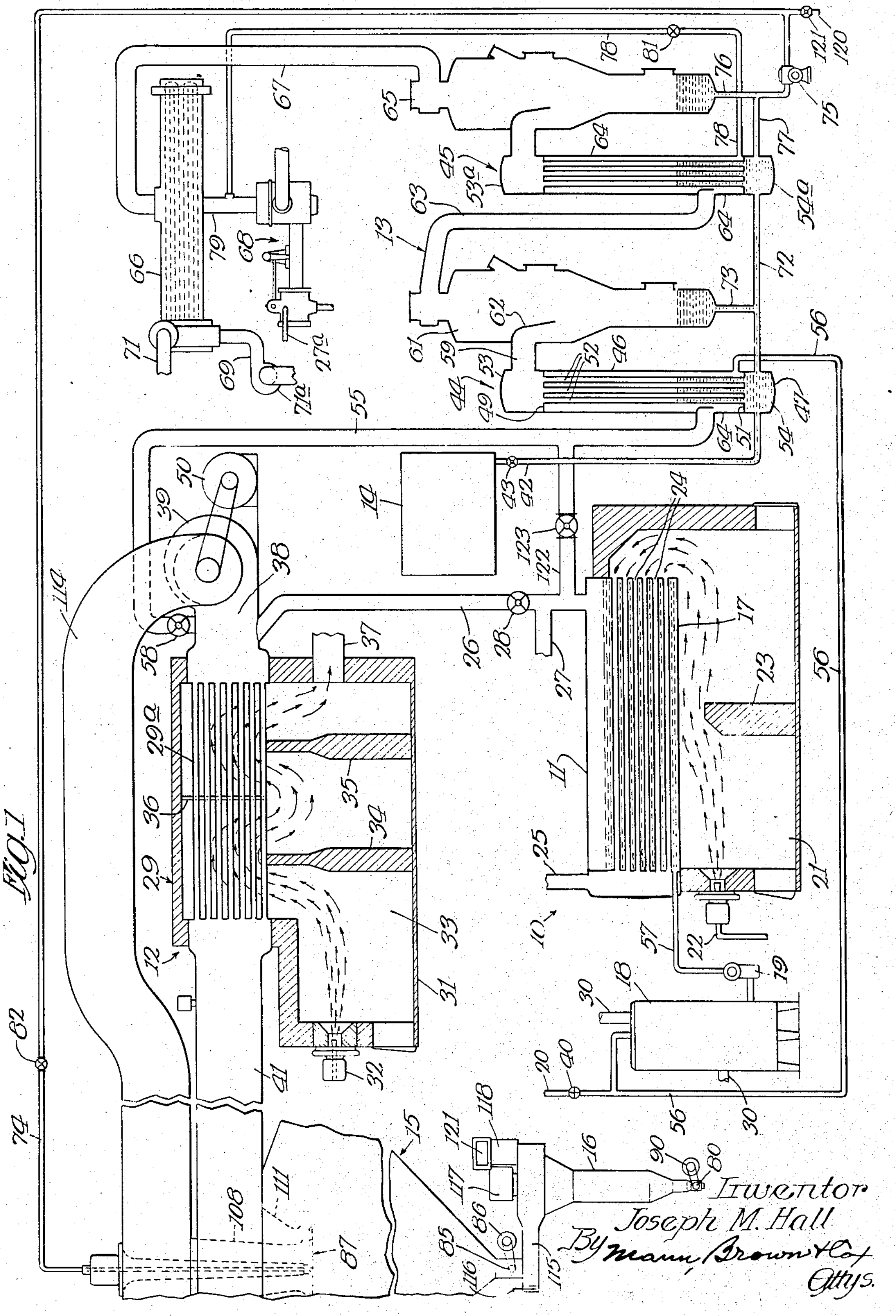
Fig. 1 is a side elevation of a liquid product concentrating, dehydrating and collecting apparatus, shown more or less diagrammatically, with parts broken away and parts in section.

It is common practice, in dehydrating liquid products, to spray the product in finely divided particles into a current of heated gaseous medium and then to separate the dehydrated particles from the gaseous medium by centrifugal mechanism. Great difficulties have been encountered in the different types of equipment employed. In some types of apparatus, the material is not sufficiently dried before it comes into contact with the walls of the dehydrator chamber to prevent its adherence to the walls of the chamber. In others, the material, if it contains sugar such as milk and the like, is caramelized, while in others, such a large proportion of the fines escape from the dehydrator as to necessitate the use of additional equipment such as screens, or the like, to render the use of such equipment economical. The present invention avoids these objections by the use of a system in which the material is so treated that it is sufficiently dehydrated as to avoid adherence and is sufficient to meet the requirements of the trade and yet is not heated to such an extent as to affect the chemical composition of the dehydrated product. The critical stage of this treatment is that received in the dehydrator chamber but for a full understanding of the operation of the dehydrator chamber, the apparatus for concentrating and dehydrating the liquid product will be described.

While any suitable gaseous drying medium may be employed, the apparatus will be described as using superheated steam at low pressure.

In the present invention, steam is used in what may be termed a closed circuit as the dehydrating fluid so that the moisture removed from the liquid particles may also be utilized as a part of the cooling medium. But since the dehydrating fluid is being added to continuously by moisture in the form of steam from the liquid product during its dehydration, it is necessary to continuously remove this extra amount of moisture or steam from the system. This is accomplished in an economical manner by utilizing steam from this circuit mixed with steam from the steam generating mechanism in what may be termed a secondary closed circuit through an evaporator and a steam generator and utilizing steam from this circuit for operating the various pumps and other mechanism employed in the plant. In the evaporator, the liquid product is concentrated preparatory to being supplied to the dehydrator.

In dehydrating milk and other liquid products containing sugar, it is necessary that the temperature of the particles shall not rise to such an extent as to caramelize the sugar content of the milk or other product or otherwise injure the solid particles after they have been dehydrated.

It is obviously necessary that the dehydrating fluid shall remain dry during its entire passage through the dehydrating chamber. Superheated steam meets all of these requirements if properly applied. Steam used as the dehydrating fluid may be introduced at a very high temperature because the evaporation of the moisture in the particles will prevent the rise of temperature of these particles to an objectionable extent during the process of evaporation and since the steam or vapor from the moisture evaporated from the liquid particles absorbs a considerable amount of heat from the steam, rendering it latent, the temperature of this superheated steam will be reduced by the time the moisture is evaporated to such an extent that the dried particles are not injured for the exceedingly brief time they are exposed after being dehydrated.

In the use of superheated steam for dehydrating milk, for instance, it has been found that satisfactory results may be obtained by introducing the steam into the dehydrating chamber at around 400° F. at substantially atmospheric pressure and conducting the steam through the chamber at such a velocity that there will be a complete change of steam within the chamber around three times per minute, the product being promptly cooled to around 100° F. after being dehydrated. By employing the principle of the cyclone collector in removing the solid particles from the steam and the steam axially from the dehydrator, long exposure and consequent injury to the particles by the heat is avoided.

Referring now to the drawings, the reference character 10 designates generally the concentrating and dehydrating apparatus which comprises a boiler 11, a superheater 12, concentrating or evaporating apparatus 13, a liquid product supply reservoir 14, a dehydrator or dehydrating chamber or cabinet 15 and a primary collector or separator 16.

The boiler 11 may be of any suitable or conventional type and is provided with a liquid container portion 17 for containing the heating fluid, as water, that is fed to the boiler by the feed water heater 18 by means of the pump or the like 19 and by water conducted through the pipe 20 from a suitable source of supply, not shown. The boiler is adapted to be heated by a furnace 21 having an oil or other burner 22 of any suitable construction. The steam is conducted through the preheater by a pipe 30 entering the lower portion of the preheater and leaving through the upper end thereof, as shown in Fig. 1.

The firebox of the furnace is provided with a back wall or baffle 23 for directing heated gases up into the boiler 11 for heating the same. The boiler is provided with flues or passages 24 through which the heated gases are conducted to the stack 25. The water is converted into steam under pressure in the boiler 11 and from thence is conducted through the pipe 26 to the superheater, a branch pipe 27 being provided for conducting steam to the motors or engines for operating the various parts of the apparatus used in the plant. The pipe 26 is provided with a pressure reducing valve 28 for controlling the amount of steam delivered to the superheater. The steam in the superheater is maintained at the desired low pressure by means of this valve.

The superheater 12 comprises a heat exchange member 29 having tubes or flues 29a through which the steam passes and also having a heating furnace 31 provided with an oil or gas burner 32 in one wall thereof. The combustion chamber 33 of the furnace is provided with baffles 34 and 35 rising from the bottom wall of the combustion chamber and with a baffle 36 extending downwardly from the upper wall of the superheater between the walls 34 and 35 so that the heated gases will be caused to travel in a serpentine path for heating the tubes and superheating the steam flowing therethrough. The products of combustion, that is, the heated gases are discharged into the atmosphere or escape into the stack through a passage 37. The superheater 12 is provided with an antechamber or header 38 within which is mounted a blower or fan 39 which is adapted to be operated by a motor 50. This fan is of sufficient capacity to deliver the steam, which is at low pressure, into the dehydrator at high velocity. The steam from the boiler 11 passes through the pipe 26 into the antechamber 38 and a portion of it is forced through the superheater into a passage 41 leading to the dehydrator 15, see Fig. 2, and another portion of the steam is forced through a passage to the primary evaporator, as will presently appear.

The liquid product, before it is treated, is contained in the reservoir 14 and is conducted to the concentrating or evaporating apparatus 13 through a pipe 42 having a valve 43 therein for controlling the amount of liquid supplied to the concentrating apparatus. The concentrating apparatus 13 may be of any suitable form and of any desired number of units. In the form of the construction shown, which is by way of example only, two concentrator or evaporator units 44 and 45 are employed, any suitable number may be used.

The unit 44 is provided with a heating portion or heating chamber 46 which may be regarded as a heating jacket and a liquid containing portion 47. In the form of the construction shown, the unit comprises an elongated casing 48 having tube sheets 49 and 51 spaced from the ends thereof in which the ends of the vertical tubes 52 are secured. These sheets and tubes divide the unit into an upper header 53 and a lower header 54 which are connected together through the tubes 52. The space around the tubes between the sheets constitutes the heating chamber or heating jacket 46 for heating the tubes containing the liquid product for evaporating a portion of the moisture therefrom. The pipe 42 conducts the liquid product from the reservoir 14 to the lower header 54. A conduit 55 is adapted to conduct a portion of the heating fluid flowing through the antechamber 38 of the superheater to the steam chamber or jacket 48 of the heating unit 44 for heating the liquid product therein. This conduit 55 also constitutes a vent for removing excess steam formed in the dehydrating circuit from the moisture evaporated from the particles of the liquid product during its dehydration.

It is desirable that the heating fluid used in concentrating the liquid product which, in the present instance, is steam, be confined to a closed circuit so that it may be used over and over again thereby conserving the heat contained in the water of condensation.

In the form of the device shown, the jacket 46 is connected as by means of a passage or pipe 56 to the feed water heater 18 and from thence the fluid is pumped by the pump 19 through pipe 57 into the boiler 11. Fresh water is introduced into the boiler 11 through a pipe 20 from a suitable source of supply. The amount introduced is controlled by a valve 40. A valve 58 is adapted to control the amount of steam circulated through the pipe 55 and the evaporator or concentrating unit 44.

In the form of the construction shown, the steam generated in the unit 44 is utilized as the heating fluid for the next succeeding concentrating or evaporating unit 45 and in order to do this, it is necessary that the pressure within the unit 45 be lower than that in the unit 44 so that the steam will flow in that direction. As shown, the header 44 is provided with a passage 59 which is in communication with a liquid collector 61 having a baffle 62 whereby particles of the liquid product passing over with the steam through the passage 59, due to the violent ebullition in the unit 44, will be directed downwardly and be collected in the bottom of the chamber and the steam separated from these particles will pass over by a passage 63 into the steam chamber or jacket 64 of the second concentrating unit 45.

Since the unit 45 is of substantially the same construction as the unit 44, it is not thought necessary to repeat the description of the same at this point any further than to state that it is provided with an upper header 53a, a lower header 54a and a steam jacket 48a, the same as the evaporator or concentrating unit 44. The upper header 53a is in communication with a liquid collector 65 which is of substantially the same construction as the collector 61. The collector 65 is in communication with a condenser 66 through a pipe 67 connected to their upper portions and the condenser is in turn in communication wtih a vacuum pump 68 through a conduit or pipe 79. The condenser 66 is adapted to be supplied with cool water through pipe 69 by a pump 71a which forces the same through the condenser and out through the pipe 71 in a manner well known in the art. Steam is supplied to the pump 68 from the pipe 27 through the pipe 27a.

The lower headers 54 and 54a are in communication through a pipe 72 which is also in communication with the collector 61 through a pipe 73. A pipe 76 having a pump 75 associated therewith is in communication with the lower end of the collector 65. A branch pipe 77 places the pipe 76 and the header 54a in communication. In order to reduce the pressure within the steam jacket 64, a pipe 78 is in communication with the lower part of the jacket 64 and with a pipe 79 leading from the condenser 66 to the vacuum pump 68. A valve 81 is interposed in the pipe 78 for controlling the amount of pressure in the steam jacket 64. Since the steam jacket 64 is in communication with the vacuum pump 68 through the pipes 78 and 79 and the steam jacket 64 is also in communication with the collector 61 and with the header 53, it is evident that the headers 53 and 53a may be maintained at subatmospheric pressure, the header 53a being maintained at lower pressure than the header 53. By means of this arrangement, the liquid passes from the evaporator 44 to the evaporator 45 by the difference in pressure therein and due to this difference in pressure, the liquid in the evaporator 45 is boiled at a lower temperature so that the steam passing over through the pipe 63 will further concentrate the liquid in the evaporator 45. The concentrated liquid is supplied through the pipe 74 by the pump 75 to the dehydrator 15, the amount being controlled by a valve 82 in the pipe 74.

The dehydrator 15 is of the cyclone collector type and comprises a casing having an upper cylindrical portion 83 and a lower tapered portion 84. The tapered portion 84, on the walls of which the dehydrated material is thrown by centrifugal action, is provided at its lower end with a rotary valve 85 for the discharge of the dehydrated material. This valve is operated by a motor 86 in a manner well known in the art.

Suitable means are provided for atomizing the concentrated liquid product delivered to the dehydrator 15 through the pipes 74 from the evaporators. In the form of the construction shown, a rotating head 87 is employed for atomizing the concentrate. This head is attached to a rotating spindle 88, Fig. 9, which extends upwardly through a tapered casing 89 arranged axially of the dehydrating chamber 15 and secured at its upper end to a plate 91 which in turn is secured to the casing 92 which constitutes the return conduit for the superheated steam, as will presently appear.

Mounted on the plate 91 is a motor 93, the armature of which is integral with, or rigidly connected to the spindle 88. The spindle 88 is provided with an axial bore 94 which is in communication with the outer end of the pipe 74. The head 87 is provided with an upwardly extending hub 95 which is keyed to the lower end of the spindle 88, see Fig. 9, and rotates therewith. This hub is rotatably mounted in a cap 96 detachably connected to the lower end of the housing 89 as shown more clearly in Fig. 9 of the drawings.

Suitable anti-friction bearings 97 are employed between the hub 95 and cap 96. The cap 96 is provided on its lower end with a recess 98 for receiving excess lubricant directed therein by the deflector 99. Oil is adapted to be supplied to the bearings through a pipe 101 extending upwardly through the casing 89.

The hub 95 is provided with a recess or receptacle 102 in its lower portion for providing a reservoir for concentrate delivered through the pipe 74 and the bore 94 in the spindle 88. Cast integral with the hub or rigidly secured thereto are a plurality of arms 103, four being shown, each of which is provided with a bore or passage 104 extending lengthwise thereof, that is, radially from the reservoir 102 for discharging the concentrate which is maintained under pressure in the reservoir 102 by the pump 75. The outer end portions of the arms 103 are connected together by arcuate members forming a circle 105. This circle is concentric with the axis of the spindle 88 and reservoir 102 whereby the air resistance to the turning of the arms will be reduced to a minimum. The arms 103 extend outwardly beyond the circle 105 and form discharge nozzles 106 which are in alinement with the passages 104 in the arms 103. The arms 103 are so fashioned that they will constitute the vanes of an exhaust fan for exhausting steam from the dehydrator, as will presently appear.

Figures 6, 7, 8, 9:
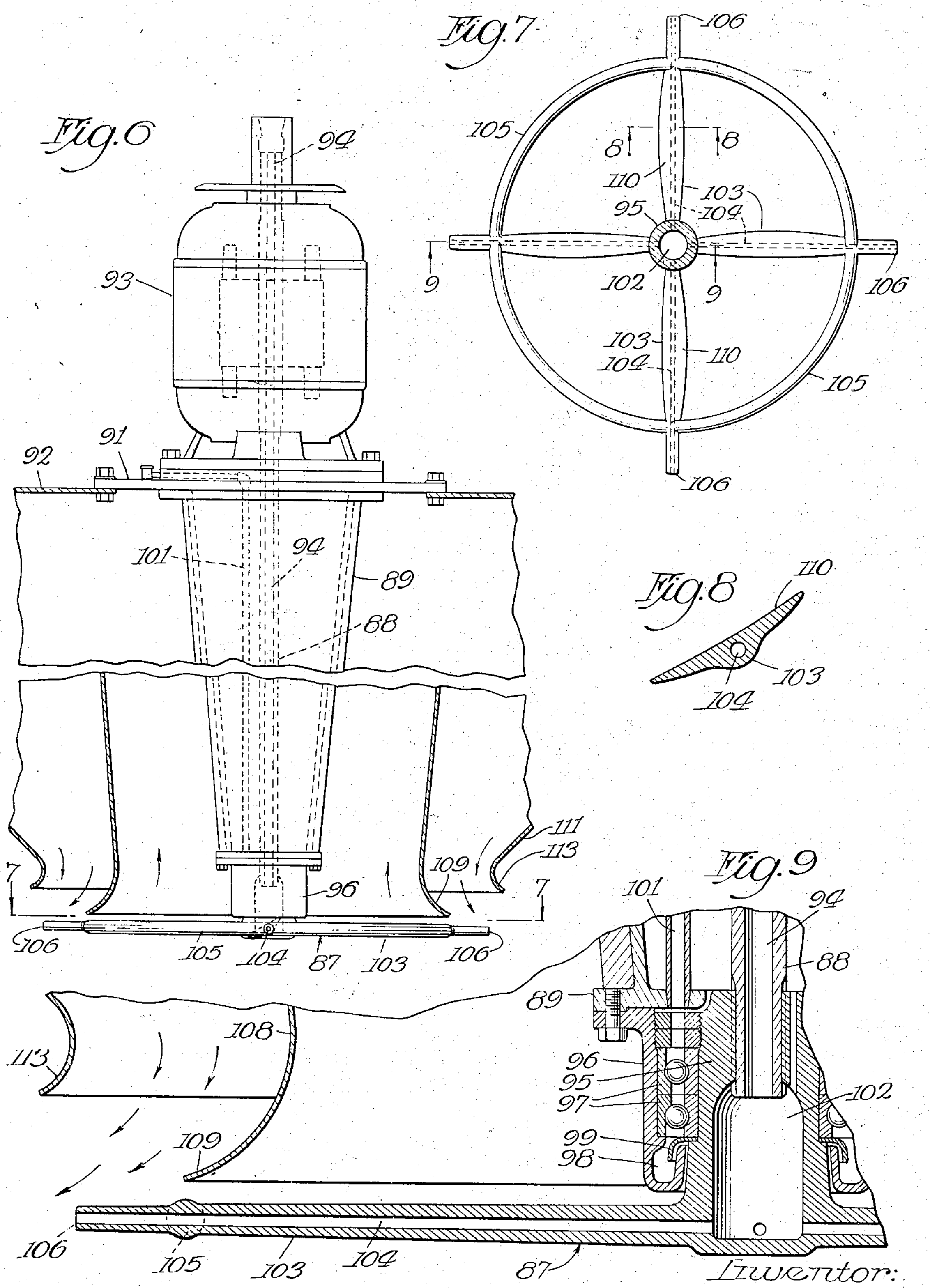
Fig. 6 is a vertical section through an upper portion of the dehydrator shown on an enlarged scale from that shown in Fig. 1, and with parts broken away.
Fig. 7 is a section on the line 7—7 of Fig. 6.
Fig. 8 is a section on the line 8—8 of Fig. 7.
Fig. 9 is a section on the line 9—9 of Fig. 7, on an enlarged scale.

In cross-section, the arms will be more or less flat on their advancing side in a plane at an angle to the horizontal as shown at 110 in Fig. 8. These blades exhaust the steam or vapor from the dehydrator and discharge the same into the return conduit 114 on the intake side of the fan or blower 39. The arcuate members or braces 105 are located beneath the lower end of the casing 108 and assist in closing the space between said casing and arms.

Figures 2, 3, 4, 5:
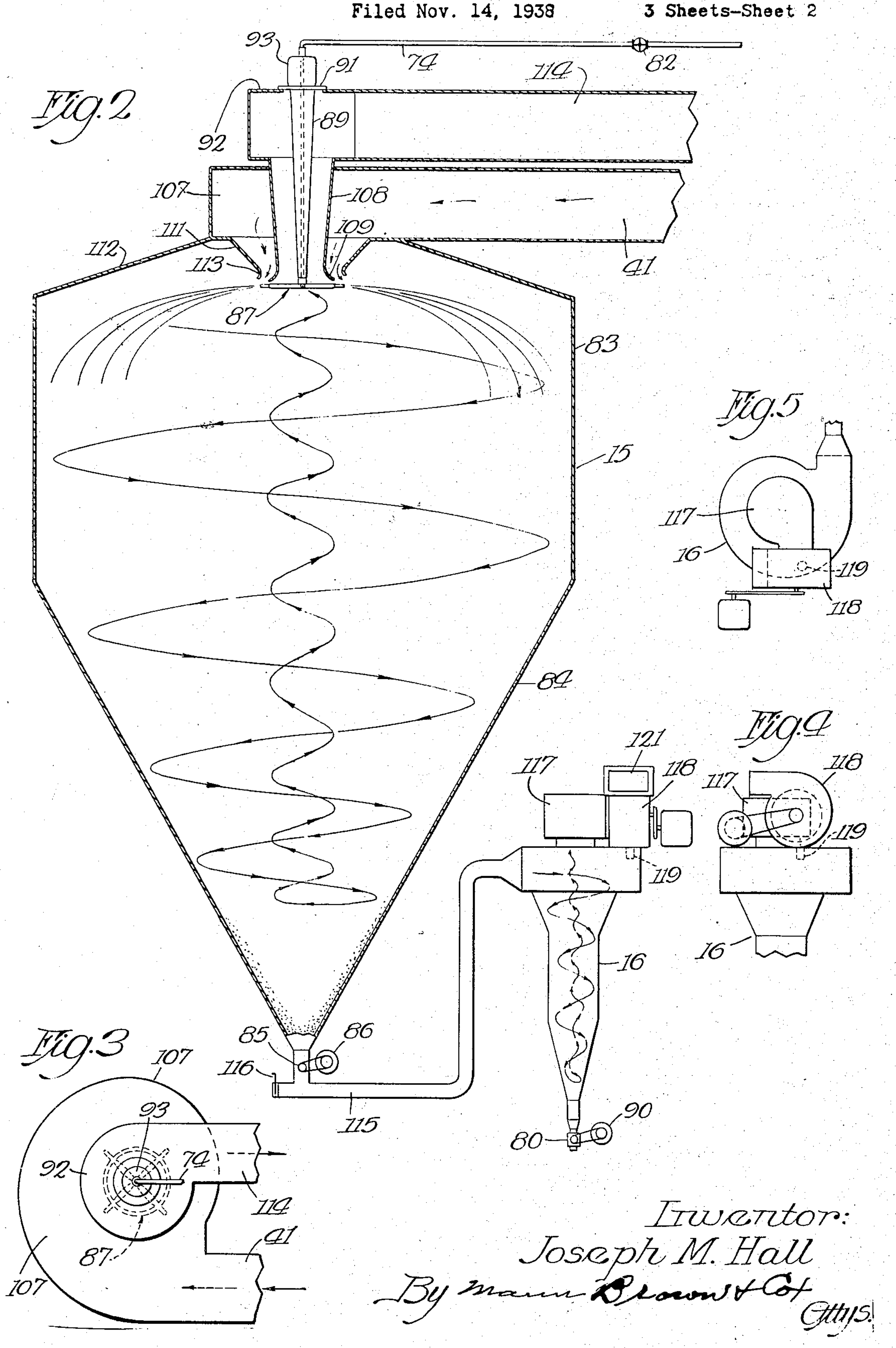
Fig. 2 is a side elevation of a liquid product dehydrating and collecting apparatus, shown more or less diagrammatically, with parts in section and parts broken away.
Fig. 3 is a top plan view of the mechanism at the upper end of the dehydrator with the dehydrator casing removed for the sake of clearness.
Fig. 4 is a side elevation of a portion of the collector mechanism, with parts broken away.
Fig. 5 is a top plan view thereof.

Suitable means are provided for dehydrating the concentrate delivered to the dehydrator by the atomizing head 87. In the present invention, superheated steam is employed for this purpose. The steam from the superheater 29 is forced through the conduit 41 into the upper end of the dehydrator. In the form of the construction shown, the conduit 41 is in communication with a snail passage 107 extending about the housing 89, Fig. 3. The snail will cause the steam to rotate about a vertical axis as it is being delivered to the dehydrator. This steam is directed across the periphery of the rotating spray head that is, across the nozzles 106, by means of a casing 108 which is attached to the return conduit 114 of the fan. The steam or drying medium is caused, by the snail 107, to rotate in the same direction as the head 87, as shown by the arrows in Fig. 3, and the rotation of the nozzles assists in increasing the rotation of the incoming drying medium. The casing 108 is in communication with the return conduit 114 of the fan 39, as will presently appear. It surrounds the housing 89 and is spaced therefrom. The lower end of the casing 108 is flared outwardly as at 109 for directing the rotating stream of steam outwardly and downwardly. A converging conical casing 111 attached to the snail and to the upper wall 112 of the dehydrator is employed for directing the stream downwardly and inwardly. This casing has its lower end curved outwardly as at 113 so as to cooperate with the curvature 109 to direct the steam outwardly and downwardly across the discharge nozzles as they are rotating thereby assisting in atomizing the concentrate and removing the moisture contained in the particles. This steam or drying medium and the particles will be caused to move outwardly and then downwardly in an outer spiral in the dehydrator and the dry particles will be thrown outwardly by centrifugal force and collected in the bottom of the dehydrator and the steam or drying medium will thereafter move upwardly toward the distributor head in an upwardly moving inner spiral in contact with the outward spiral and rotating in the same direction, as indicated in Fig. 3, whereby the fine material carried over into the inner spiral will be thrown by centrifugal action into the outer spiral and the steam or drying medium will be withdrawn by the suction of the fan 39 and head 87 axially through the casing 108 into a return conduit 114 which is connected with the intake of the fan 39. It will thus be seen that the drying medium, on entering the dehydrating chamber, flows outwardly toward the side walls of the chamber and then downwardly in an outer spiral path and that the liquid product is sprayed into the medium as it enters the chamber so that an appreciable length of time transpires between the time the sprayed material is introduced into the entering medium and the contact of the mixture with the peripheral wall of the chamber. During this time and while the mixture is moving along this gradually widening spiral path, the particles are dehydrated and consequently will not adhere to the sides of the dehydrator when they come into contact therewith. Some of the finer dehydrated particles of the product will be carried over into the ascending inner spiral and the rotation of this spiral, which is augmented by the rotation of the fan blades of the distributor head 87, will throw these particles, by a centrifugal force, into the outer spiral whereby substantially all of the dehydrated particles will be collected by gravity within the lower portion of the chamber. It will also be seen that the superheated steam will be used for dehydrating the concentrated liquid product in a closed circuit without being condensed and being promptly removed axially of the dehydrator will not injure the dry particles that are moving circumferentially of the dehydrator cone.

By means of the valve 28, the steam generated in the primary boiler or heater 11 may be maintained at any desired pressure for operating the prime movers of the entire system, such as the pump 68 and the like, while the steam within the superheating circuit is being maintained at lower pressure. By means of the valve 28, the steam generated in the boiler 24, or at least a part of it, is permitted to expand into the superheater 29 where its temperature is greatly increased and its pressure maintained substantially constant at a little, if any, above atmospheric. It has been found that steam at about atmospheric pressure with a temperature of around 400° or 450° F. gives satisfactory results for dehydrating atomized liquid particles in the dehydrator. The pipe 55 may be regarded as a vent for the steam in the dehydrating circuit and with the aid of the valve 58, the pressure within this circuit may be maintained substantially constant. The excess moisture introduced into this circulating system from the moisture evaporated from the liquid particles in the dehydrator is conducted to the primary boiler through the evaporating circuit and is taken from the system through pipe 27 as steam under pressure and utilized for operating motors or engines used in the plant. The exhaust from these engines is used in the preheater as a heating medium. This added moisture, if not sufficient, may be augmented by the feed pipe 20 from a source of water supply.

The dehydrated product escapes from the dehydrator at elevated temperature, too hot to be placed in containers, and in order to lower the temperature, the product is discharged by the valve 85 into a conduit 115 having a valve 116 which will admit fresh cool air drawn into the conduit 115 by the fan in the secondary collector 118 for cooling the product. The conduit 115 leads to the cyclone separator 16 into which it discharges the air and desiccated product tangentially in the usual manner.

The air is withdrawn from the collector axially thereof by the fan in the secondary collector 118. It passes through a snail 117 into the secondary collector 118 which will collect any residue product escaping with the air from the primary collector 16. This collector will discharge the separated material through a conduit 119 back into the primary collector 16 and the separated air will be discharged through a suitable passage 121 in the uual manner. Since the cyclone separator 16 and the secondary separator are of the usual or any well known construction, it is not thought necessary to describe the same in detail. The cooled dehydrated material is removed from the separator 16 through a rotary valve 80 operated by a motor 90.

In the operation of the system, steam from the boiler 11 is conducted through the pipe 26 to the header 38 and forced through the conduit 41 through the snail 107 and introduced into the dehydrator in a spiral movement across the spray of liquid product thrown outward by the spray head 87, as described above. The steam, being superheated, will dehydrate the product and the centrifugal force will throw the solid dehydrated particles outward against the walls of the dehydrator and gravity will cause the particles to collect in the lower part of the dehydrator in the form of dry powder. This powder is discharged into a cooling passage 115 and air drawn through this passage cools the powder and delivers the same into the air separators where it is separated from the air and is ready for packaging. The steam within the dehydrator is removed axially upwardly therefrom by the suction of the fan 39 through the passage 114 and portions are recirculated through the superheater and a portion circulated through the jacket 46 of the evaporator 44 and returned to the boiler through the preheater 18. Steam is withdrawn from the system through the pipe 27 which may be so regulated as to compensate for the amount of moisture added to the system by the evaporated moisture from the liquid product.

Preferably, though not necessarily, means such as the pipe 122 having a valve 123 are provided for shunting steam under pressure directly from the boiler 11 to the steam jacket 46 of the evaporator 44 for augmenting the concentration of the liquid contained therein. This shunt may be caused to operate in conjunction with the steam from the dehydrator circuit or independently thereof. When used, it establishes what may be termed a shunt circuit through the boiler 11 and evaporator 44.

If it is desired that the concentrated product be not dehydrated, it may be removed through a suitable conduit 120 controlled by the valve 121.

In the operation of the system described above, for dehydrating milk, the following was found to give satisfactory results. The pressure of the steam in the boiler 11 was whatever was necessary to operate the various pumps and other apparatus in the plant and was around 50 to 70 pounds. The steam or vapor introduced into the dehydrator was around 400° to 450° F. and at very low pressure, about that of the atmosphere or slightly above. The cubical capacity of the dehydrator was about 5000 cubic feet and the velocity of the steam was such that about 15,000 cubic feet was introduced into the dehydrator per minute. The powder was discharged at around 225° F. and was cooled to 100° F. The above is given by way of example only and it is not here intended that the words used shall be construed as words of limitation but merely as words of description of one form of the device that has proven practical.

It will thus be seen that by the use of a dehydrator that functions as a cyclone collector, steam at very high temperatures may be used without injuring the product. The hottest steam contacts the wettest particles and the moisture evaporated from them prevents their becoming overheated. By the time the moisture has been evaporated from the particles, they will have moved downwardly and have been thrown outwardly by centrifugal force against the inner periphery of the dehydrator and in the meantime, the steam is drawn toward the axis of the dehydrator and exhausted through the top thereof whereby the dry particles are subjected to the steam just a sufficient interval of time to dehydrate but not injure the same.

This is considered an important feature of the invention because it permits the use of superheated steam at such a temperature that the same after passing through the dehydrator is sufficiently hot to be used in the primary evaporator.

While in the present system superheated steam at low pressure is employed as the drying gaseous medium, it is understood that so far as the function of the dehydrator chamber and associated mechanism is concerned, it is immaterial what type of drying gaseous medium be employed since the principle of operation would remain unchanged.

It is thought from the foregoing taken in connection with the accompanying drawings that the construction and operation of my device will be apparent to those skilled in the art, and that changes in size, shape, proportion and details of construction may be made without departing from the spirit and scope of the appended claims.

I claim as my invention:

1. A method of dehydrating a liquid product which comprises introducing a gaseous drying medium into one end of a substantially circular walled internally unobstructed chamber, causing said medium to flow outwardly from the axial zone of said chamber and to rotate in a spiral current outwardly of said axial zone toward the opposite end of the chamber and within the same, causing said medium to return through said axial zone in an inner spiral current rotating in the same direction as the outer current and in contact therewith to an outlet in the first named end of the chamber and within said axial zone, and spraying a liquid product substantially uniformly about the axis of said chamber into the outer spiral current only, adjacent to said outlet, whereby dried particles will be thrown to the wall of the chamber by centrifugal action from both currents for collection at the second named end of the chamber.

2. A method of dehydrating a liquid product which comprises introducing a current of gaseous drying medium into a chamber, causing said medium to flow outwardly and to descend in an outer spiral within said chamber to the lower portion thereof and in contact with the side wall of said chamber, causing said medium to flow upwardly from the lower portion of said chamber to the exterior thereof in an inner spiral within the first mentioned spiral and in contact with the first mentioned spiral throughout substantially the whole axial extent thereof, and spraying a liquid product radially outwardly into said first named spiral only, whereby the sprayed particles of said liquid product in the outer spiral will be dehydrated and thrown by centrifugal action against the wall of said chamber for collection by gravity in the lower portion of said chamber and the dried particles within said inner spiral will be thrown by centrifugal action into said outer spiral.

3. A method of dehydrating a liquid product in a continuous operation which comprises continuously introducing a current of gaseous drying medium into a chamber to flow outwardly in said chamber and to descend spirally in an outer spiral therein to the lower portion thereof, causing said medium to flow upwardly from the lower portion of said chamber to the exterior thereof in an inner spiral within the first mentioned spiral and in contact with the first mentioned spiral throughout substantially the whole axial extent thereof, centrifugally discharging a liquid product in finely divided particles continuously outwardly into the incoming drying medium only from the inner zone thereof whereby finely divided particles will be thrown outwardly by centrifugal action across the outer spiral for collection by gravity in the lower portion of said chamber and dried particles escaping into said inner spiral will be thrown by centrifugal action into said outer spiral.

4. In a system for dehydrating liquid products, a dehydrating chamber of substantially circular cross-section having the upper portion of its interior unobstructed, an outer intake conduit extending axially downwardly into said upper portion, a discharge conduit within and substantially concentric with said outer conduit whereby a substantially annular intake orifice is provided between said conduits, a distributor head supported adjacent to, but beneath, said conduits, said head having means for discharging an atomized liquid product outwardly beyond said discharge conduit and across said orifice, and means for directing a gaseous drying medium through said orifice outwardly across the atomized product against the inner periphery of the chamber in an outer spiral down along said periphery to the lower portion of the chamber, said medium thereafter flowing to said discharge conduit spirally upwardly within said outer spiral and in contact therewith, whereby solids may be centrifugally thrown from the outer spiral to the wall of the chamber and from the inner to the outer spiral and thence to the wall of the chamber and gravitate to the bottom thereof.

5. In a system for dehydrating liquid products, a dehydrating chamber of substantially circular cross-section having the upper portion of its interior unobstructed and having a tapered lower portion, an outer intake conduit for conducting a drying medium to said chamber, a discharge conduit within and substantially concentric with said outer conduit, both conduits being connected to said chamber axially thereof, whereby a substantially annular intake orifice for the chamber is provided between said conduits, a distributor head supported adjacent to, but beneath, said conduits, said head having means for discharging an atomized liquid product outwardly across said orifice, means for directing a gaseous drying medium through said orifice outwardly across the atomized product against the inner periphery of the chamber in an outer spiral down along said periphery to the lower portion of the chamber, said medium thereafter flowing to said discharge conduit spirally upwardly within said outer spiral and in contact therewith, and means for assisting in moving said medium in said spirally upward path, said head means discharging into the incoming drying medium only, whereby solids may be centrifugally thrown from the inner to the outer spiral and particles within the outer spiral may be thrown to the wall of the chamber and gravitate to the bottom thereof.

6. In a system for dehydrating liquid products, a dehydrating chamber of substantially circular cross-section having the upper portion of its interior unobstructed, an outer intake conduit and an inner substantially concentric discharge conduit both extending axially downwardly into said upper portion and having their inner ends outwardly flared whereby a substantially annular intake orifice is provided between said ends, a distributor head supported adjacent to, but beneath, said conduits, said head having means for discharging an atomized liquid product outwardly beyond said discharge conduit and across said orifice, and means for directing a gaseous drying medium through said orifice outwardly across the atomized product against the inner periphery of the chamber in an outer spiral down along said periphery to the lower portion of the chamber, said medium thereafter flowing to said discharge conduit spirally upwardly within said outer spiral and in contact therewith, whereby solids may be centrifugally thrown from the outer spiral to the wall of the chamber and from the inner to the outer spiral and thence to the wall of the chamber and gravitate to the bottom thereof.

7. In a system for dehydrating liquid products, a dehydrating chamber of substantially circular cross-section having the upper portion of its interior unobstructed, an outer intake conduit extending axially downwardly into said upper portion, a discharge conduit within and substantially concentric with said outer conduit whereby a substantially annular intake orifice is provided between said conduits, a distributor head supported adjacent to, but beneath, said conduits, said head having means for discharging an atomized liquid product outwardly beyond said discharge conduit and across said orifice, means for rotating said head, means for directing a gaseous medium through said orifice, across the atomized product and against the inner periphery of the chamber in an outer spiral down along said periphery to the lower portion of the chamber and thence spirally upwardly within said outer spiral and in contact therewith to said discharge conduit, and means for assisting in moving said medium in said inner spiral to said discharge conduit comprising fan blades carried by said rotating head, whereby atomized particles will be dehydrated and centrifugally thrown from the outer spiral to the wall of the chamber and from the inner to the outer spiral and thence to the wall of the chamber and gravitate to the bottom thereof.

8. In a system for dehydrating liquid products, a dehydrating chamber of substantially circular cross-section having the upper portion of its interior unobstructed, an outer intake conduit extending axially downwardly into said upper portion, a discharge conduit within and substantially concentric with said outer conduit whereby a substantially annular intake orifice is provided between said conduits, a distributor head supported adjacent to, but beneath, said conduits, said head having means for discharging an atomized liquid product outwardly beyond said discharge conduit and across said orifice, means for directing a gaseous medium through said orifice, across the atomized product and against the inner periphery of the chamber in an outer spiral down along said periphery to the lower portion of the chamber and thence spirally upwardly within said outer spiral and in contact therewith to said discharge conduit, and means for assisting in moving said medium in said inner spiral to said discharge conduit comprising an exhaust fan having blades extending radially in said discharge conduit, whereby atomized particles will be dehydrated and centrifugally thrown from the outer spiral to the wall of the chamber and from the inner to the outer spiral and thence to the wall of the chamber and gravitate to the bottom thereof.

9. In a system for dehydrating liquid products, a dehydrating chamber of substantially circular cross-section having the upper portion of its interior unobstructed, an outer intake conduit extending axially downwardly into said upper portion, a discharge conduit within an substantially concentric with said outer conduit whereby a substantially annular intake orifice is provided between said conduits, rotatable means comprising a combined distributor head and fan supported adjacent to, but beneath, said conduits and having nozzles for discharging an atomized liquid product outwardly beyond said discharge conduit and across said orifice; means for directing a gaseous medium through said orifice, across the atomized product and against the inner periphery of the chamber in an outer spiral down along said periphery to the lower portion of the chamber and thence spirally upwardly within said outer spiral and in contact therewith to said discharge conduit, and means for assisting in moving said medium in said inner spiral to said discharge conduit comprising radiating arms forming part of said rotatable means, said arms supplying the liquid product to said nozzles and forming the blades of said fan, whereby atomized particles will be dehydrated and centrifugally thrown from the outer spiral to the wall of the chamber and from the inner to the outer spiral and thence to the wall of the chamber and gravitate to the bottom thereof.

10. In a system for dehydrating liquid products, a dehydrating chamber of substantially circular cross-section having the upper portion of its interior unobstructed, an outer intake conduit and an inner substantially concentric discharge conduit both extending axially downwardly into said upper portion and having their inner ends outwardly flared whereby a substantially annular intake orifice is provided between said ends, rotatable means comprising a combined distributor head and fan supported adjacent to, but beneath, said ends and having nozzles arranged outwardly beyond the inner conduit for discharging an atomized liquid product across said orifice, means for directing a gaseous medium through said orifice, across the atomized product and against the inner periphery of the chamber in an outer spiral down along said periphery to the lower portion of the chamber and thence spirally upwardly within said outer spiral and in contact therewith to said discharge conduit, and means for assisting in moving said medium in said inner spiral to said discharge conduit comprising radiating arms forming part of said rotatable means and terminating in said nozzles for supplying the liquid product thereto and forming the blades of said fan, whereby atomized particles will be dehydrated and centrifugally thrown from the outer spiral to the wall of the chamber and from the inner to the outer spiral and thence to the wall of the chamber and gravitate to the bottom thereof.

11. A method of dehydrating a liquid product which comprises introducing a gaseous drying medium into the upper end of an internally unobstructed chamber having a tapered lower portion, causing said medium to flow outwardly from the axial zone of said chamber and to rotate in a spiral current outwardly of said axial zone toward the tapered end of said chamber and within said chamber, causing said medium to return through said axial zone in an inner spiral current rotating in the same direction as the outer spiral current and in contact with said outer spiral current substantially throughout the entire length of the axis of said inner spiral to an outlet in the upper end of said chamber and within said axial zone, augmenting the movement of said inner spiral current and spraying a liquid product about the axis of said chamber into the outer spiral current only adjacent to said outlet, whereby sprayed particles in the outer spiral current will be dehydrated and thrown by centrifugal action against the wall of said chamber for collection by gravity in the lower portion of said chamber and dried particles within said inner spiral will be thrown by centrifugal action into said outer spiral.

JOSEPH M. HALL.